Figure 1:
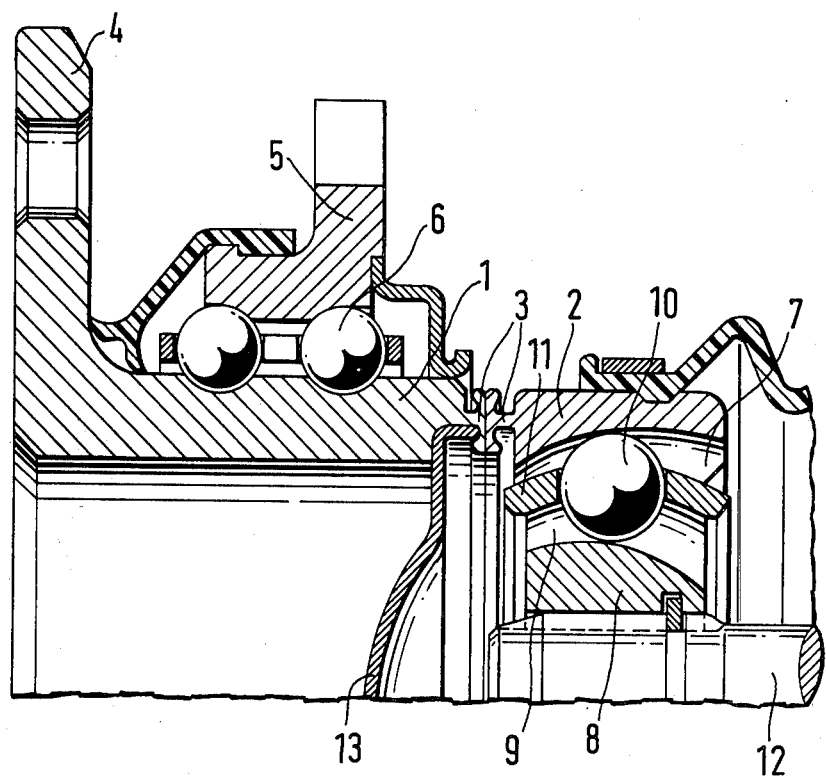

United States Patent [19]

Aucktor

[11] 4,150,553
[45] Apr. 24, 1979

[54] WHEEL BEARING MOUNT

[75] Inventor: Erich Aucktor, Offenbach am Main, Fed. Rep. of Germany

[73] Assignee: Löhr & Bromkamp GmbH, Offenbach am Main, Fed. Rep. of Germany

[21] Appl. No.: 688,832

[22] Filed: May 21, 1976

[30] Foreign Application Priority Data

May 23, 1975 [DE] Fed. Rep. of Germany ....... 2522841

[51] Int. Cl.² .............................................. B62D 7/06
[52] U.S. Cl. ..................................... 64/22; 180/43 R; 280/96.1; 280/96.3; 301/111
[58] Field of Search ............. 301/111; 280/96.1, 96.3; 219/121 EB; 64/22; 180/43 R, 70 R

[56] References Cited

U.S. PATENT DOCUMENTS

| 3,295,626 | 1/1967 | Cadiou | 280/96.3 |
| 3,583,511 | 6/1971 | Asberg | 180/43 R |
| 3,589,747 | 6/1971 | Asberg | 280/96.1 |
| 3,694,616 | 9/1972 | Brealey | 219/121 EB |
| 3,757,883 | 9/1973 | Asberg | 280/96.1 |
| 3,767,221 | 10/1973 | Asberg | 301/111 |
| 3,944,011 | 3/1976 | Ernst | 180/43 R |

OTHER PUBLICATIONS

Metals Handbook, 8th Edition, vol. 6, Welding and Brazing, Taylor Lynan, Editor May 1974, p. 473.

Primary Examiner—Samuel Scott
Assistant Examiner—R. C. Turner
Attorney, Agent, or Firm—Edmund M. Jaskiewicz

[57] ABSTRACT

A bearing mount for a wheel driven through a constant velocity universal joint has an inner bearing ring which is axially adjacent to an outer joint member of a constant velocity universal joint and is attached to the outer joint member by a welded joint formed by a low temperature welding process.

3 Claims, 1 Drawing Figure

WHEEL BEARING MOUNT

The present invention relates to a wheel bearing mount, more particularly, to such a bearing mount for a wheel driven through a constant velocity universal joint.

In order to drive a wheel hub from a constant velocity universal joint wherein the hub is journalled from a wheel support of a motor vehicle, it has been proposed to provide the outer ring member of the wheel bearing with a flange for mounting to the wheel support and the inner bearing ring is connected to the wheel hub and to the outer joint member of the constant velocity universal joint. An example of such a wheel bearing mount is disclosed in the German AS 1 915 932.

Such wheel bearing mounts are disadvantageous in that it is extremely difficult to assemble such a mount because in order to ensure proper functioning all of the component elements must be aligned concentrically with extreme accuracy before these parts are permanently connected and secured together. In addition, very close manufacturing tolerances must be observed in fabricating the various components. In those mounts in which the inner bearing ring is welded to the outer joint member of the constant velocity universal joint there is always the possibility that sparks and pieces of metal produced during the welding operation may damage the track grooves of the bearing components. Such damage may occur even when a rubber ring is utilized since this ring may slip during assembly of the mount and the presence of the ring adds to the cost and assembly of the mount.

Another disadvantage of such a wheel bearing mount is that the track grooves for the ball bearings may become undesirably shifted with respect to each other during the welding operation as a result of inaccurate concentric alignment of the components and, as a result, it will no longer be possible to achieve a precision bearing.

In another known wheel bearing mount as disclosed in German OS 2 329 554 the inner bearing ring and the outer joint member are each provided with matching Z-groove configurations. With this arrangement, the universal joint and bearing may be positioned in successive radial relationship on top of each other. However, the bearing must have a very large internal diameter which therefore makes the bearing very expensive. If the universal joint and bearing are positioned laterally side by side in the axial direction, an additional intermediate component is required which similarly adds to the overall manufacturing cost.

It is therefore the principal object of the present invention to provide a novel and improved bearing mount for a wheel driven through a constant velocity universal joint.

It is another object of the present invention to provide such a wheel bearing mount which makes use of standard component parts and which permits the use of various types of universal joints.

It is a further object of the present invention to provide such a wheel bearing mount which utilizes standard component elements assembled in such a manner so as to improve the overall operation and structure of the mount.

According to one aspect of the present invention a bearing mount for a wheel driven through a constant velocity universal joint may comprise an outer bearing ring which is adapted to be connected to a wheel support and an inner bearing ring adapted to be connected to a wheel hub. A constant velocity universal joint has an outer joint member which is axially adjacent to the inner bearing ring and is attached thereto by a weld formed by a low temperature welding process, such as friction welding, electronic beam welding or a similar low temperature welding process.

A particular advantage of the present invention is that the constant velocity universal joint and the wheel bearing may each be manufactured separately and by different processes. The joint and wheel bearing are permanently connected together to form a unit only after each individual component has been completed and fully tested. As a result, the overall scrap rate is considerably reduced and existing manufacturing equipment can be employed.

Another advantage is that various types of universal joints, such as sliding joints, parallel joints, ball or roller joints may be welded to the inner ring of the wheel bearing without incurring additional costs in either assembly or fabrication of the components.

Other objects and advantages of the present invention will be apparent upon reference to the accompanying description when taken in conjunction with the following drawing, which is exemplary, wherein there is illustrated a longitudinal sectional view through a wheel bearing mount and constant velocity universal joint connected together according to the present invention.

The wheel bearing of a motor vehicle which is shown in the drawing comprises an inner bearing ring member 1 provided with a flange 4 which is connected to the hub of the wheel. An outer bearing ring 5 is also provided with a flange construction for connecting to the wheel support in a manner known in the art. The opposing faces of the inner and outer bearing rings 1 and 5 are provided with a parallel pair of annular tracks in which are positioned a plurality of ball bearings 6 to create a double row antifriction bearing of the so-called "radiax bearing" type. The bearing is enclosed with suitable rubber or plastic flexible elements as shown in the drawing and known in art.

The constant velocity universal joint which is connected to the bearing comprises an outer joint member 2 with a bore therethrough the surface of which is provided with a plurality of substantially axially extending grooves 7. An inner joint member 8 is positioned within the bore of the outer joint member 2 and is also provided with a corresponding plurality of substantially axially extending grooves 9. The grooves 7 and 9 are arranged so as to be oppositely disposed from each other and balls 10 are positioned in the opposed pairs of grooves. A ball retainer cage 11 is positioned between the inner and outer joint members and is provided with a plurality of substantially radial openings within which the balls 10 are positioned so as to be guided therein for the transmission of a driving torque. The inner joint member 8 further comprises an axial bore within which is received a splined shaft 12 which is non-rotatably secured therein by engaging corresponding splines in the inner joint member. The shaft 12 may also be provided with a suitable non-circular cross-section which is received within a corresponding cross-section of the bore in the inner joint member 8.

The outer joint member 2 is axially adjacent the inner bearing member 1 and the neutrally engaging spaces of the bearing member 1 and outer joint member 2 are provided with equally dimensioned annular projections 3 which are in abutting relationship. These projections 3 are welded together to provide a connection between the bearing mount and universal joint. The welded joint is formed by a low-temperature welding process such as by friction welding, electronic beam welding or a similar low-temperature welding process.

Because the welded joint between the outer joint member 2 and the inner bearing member 1 is a weld formed by friction welding or the like, these components are heated to the welding temperature in only very localized regions and the welding operation is performed relatively quickly so that other portions of the components are not adversely affected as would be the case if these components were heated to near welding temperatures. Thus any distortion or deformation of the components as a result of being heated to welding temperatures is virtually eliminated and the resulting assembly of the wheel bearing mount and the universal joint is precisely and accurately aligned.

The welded connection between the annular projections 3 is enclosed by a cover 13 which may also be secured in place during the course of the welding operation.

Thus it can be seen that the present invention as disclosed a simple but accurate structure for a bearing mount for a wheel driven through a constant velocity universal joint.

It will be understood that this invention is susceptible to modification in order to adapt it to different usages and conditions, and accordingly, it is desired to comprehend such modifications within this invention as may fall within the scope of appended claims.

What is claimed is:

1. A bearing mount for a wheel driven through a constant velocity universal joint comprising an outer bearing ring having a parallel pair of first annular tracks and connected to a wheel support, an inner bearing ring having a parallel pair of second annular tracks opposed from said first tracks and connected to a wheel hub, pluralities of ball bearings in said opposed tracks to define a double row anti-friction bearing, and a constant velocity universal joint having an outer joint member axially adjacent said inner bearing ring and attached thereto by a weld, said inner bearing ring and said outer joint member each having flanges and abutting annular projections on said flanges, said abutting annular projections attached by said weld, said outer joint member being independent of said bearing such that the wheel bearing mount and the universal joint are separate units.

2. A bearing mount as claimed in claim 1 wherein said annular projections have equal dimensions.

3. A bearing mount as claimed in claim 1 wherein said weld is such as to avoid distortion and deformation of said inner bearing ring and said outer joint member from welding temperatures.

* * * * *